Nov. 17, 1953  G. B. WATKINS  2,659,686
LAMINATED GLASS STRUCTURE
Filed Feb. 13, 1950
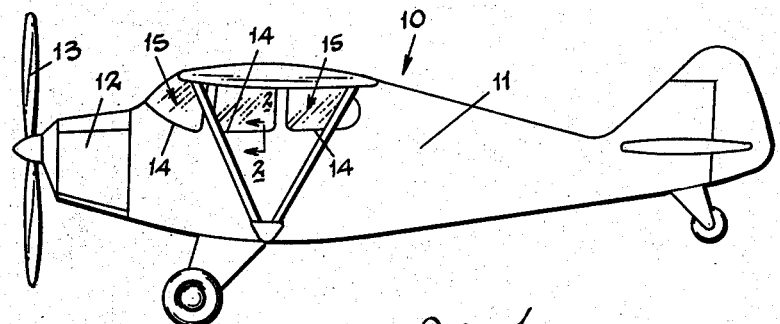
Fig. 1
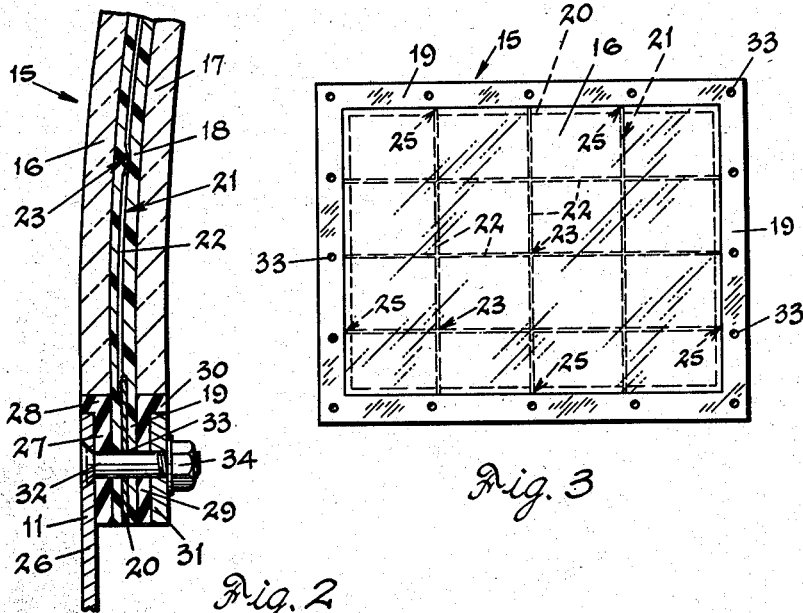
Fig. 2
Fig. 3
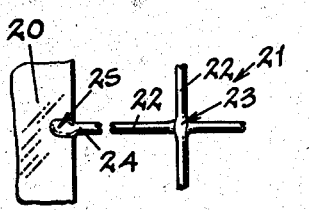
Fig. 4
Inventor
George B. Watkins
By Nobbe & Swope
Attorneys Patented Nov. 17, 1953

2,659,686

UNITED STATES PATENT OFFICE 2,659,686

LAMINATED GLASS STRUCTURE

George B. Watkins, Toledo, Ohio, assignor to Libbey-Owens-Ford Glass Company, Toledo, Ohio, a corporation of Ohio Application February 13, 1950, Serial No. 143,877

4 Claims. (Cl. 154—2.71)

The present invention relates broadly to laminated glass structures and more particularly to an improved laminated safety glass primarily adapted for use in aircraft.

In its broader aspect, this invention is concerned with laminated glass structures which are known in the art as the "extended plastic" type. Such a laminated glass unit is ordinarily composed of two sheets of glass and an interposed layer of thermoplastic material adherent thereto to provide a composite structure. The surface area of the plastic interlayer is relatively greater than the surface area of the glass sheets so that it extends beyond the edges of the glass sheets to provide a flexible attaching and sealing flange when the safety glass is mounted in a window or other opening. It is also customary in this type of laminated structure to provide the extended plastic flange with a metal reenforcement usually in the form of relatively thin flexible strips or a continuous band of a suitable metal which is embedded in the extended plastic and which projects slightly inwardly of the edges of the glass sheets. This metal reenforcement serves to maintain the stability of the laminated structure when it is installed and clamping pressure exerted thereon to anchor the same in position in the window opening.

It is an aim of this invention to provide an improved laminated safety glass structure of the reenforced extended plastic type which will resist severe thrust or pressure in both directions either from the interior or exterior of an airplane to firmly retain the structure in place against forcible displacement.

Another object of the invention is to provide such a laminated structure wherein edge deflection in the extended plastic and the weakening and shearing thereof is minimized, while maintaining the advantages of flexibility and the flush mounting of the structure in an airplane.

Another object of the invention is to provide a laminated glass structure of the above character having novel reenforcing means carried by the plastic interlayer and associated with the metal reenforcement in the extended flange thereof whereby the support for the glass load (the plastic interlayer) will be strengthened and torsional strains imposed by pressure differentials on the extended plastic flange will be substantially minimized.

A further object of the invention is to materially reduce localized strain and the imposition of shearing action in the extended plastic flange by the use of a reenforcing network or grid embedded in the plastic interlayer and connected to the metal reenforcement in the extended plastic flange in such a manner that torsional strains imposed on the structure will be sustained substantially equally throughout the reenforcing network or grid.

A further object of the invention is to provide a novel metal reenforcing means that is of particular advantage in laminated structures that are bent or curved in one or both axes and which is of a flexible character to adapt it to units of different curvatures.

Other objects and advantages of the invention will become more apparent during the course of the following description when taken in connection with the accompanying drawings.

In the drawings, wherein like numerals are employed to designate like parts throughout the same:

Fig. 1 is a representation of one type of airplane with which the present invention may be used;

Fig. 2 is a vertical transverse section taken substantially on line 2—2 of Fig. 1;

Fig. 3 is a front view of a laminated glass unit made in accordance with this invention; and Fig. 4 is a fragmentary view of a portion of the reenforcing network for the plastic interlayer showing the manner in which it is secured to the metal reenforcement in the extended plastic flange.

Referring now more particularly to the drawings, there is disclosed in Fig. 1 a conventional type of airplane 10 having a fuselage 11, forwardly located engine 12 and propeller 13. The fuselage or body 11 is provided with windshield and window openings 14 which substantially surround the pilot and enable him to have a wide range of vision. The openings 14 may be glazed with laminated glass structures of the novel and improved type provided by this invention. It will of course be appreciated that the airplane here shown is simply one form of plane with which the present invention may be used and that the invention is intended for use in aircraft of various kinds, including those designed for stratospheric or supersonic flight.

The laminated glass unit of this invention is generally designated by the numeral 15 and, as shown in cross section in Fig. 2, is composed of two sheets of glass 16 and 17 and an interposed sheet of thermoplastic material 18 such as, for example, polyvinyl butyral resin. The area of the plastic interlayer 18 is greater than the areas of the glass sheets and extends beyond their marginal edges to provide a continuous, flexible attaching or mounting flange 19. Embedded in the extended attaching flange 19 is a metal reenforcement that may consist of a one-piece metal band 20 as shown in Fig. 3 or may be formed of a plurality of separate strips. The band 20 preferably extends from the outer edge of the plastic flange 19 to a point slightly inwardly of the edges of the glass sheets 16 and 17. The metal reenforcement or band 20 serves to increase the strength and stability of the laminated glass unit and particularly the extended flange 19 thereof so that the danger of tearing or shearing of the plastic flange is substantially minimized.

In the laminated glass structures of this type, the weight of the glass sheets and the strain of pressures imposed thereon, either inwardly or outwardly, has heretofore been borne almost entirely by the plastic interlayer. These strains, when excessive, may overcome the natural capacity of the plastic to flex or "flow," and cause the plastic to be unduly deflected or even sheared off along the edges of the glass sheets thereby endangering the stability of the entire laminated glass unit. Now it is herein proposed to provide a support for the plastic interlayer 18, by embedding therein a metal wire grid or network 21 that operates as a cradle on which the remainder of the laminated glass unit is carried so that the weight of, and impacts against, the glass sheets, usually borne by the plastic interlayer, will be largely transferred to and borne by the reenforcing grid or cradle.

The grid 21 preferably consists of a network of wires 22 which may be arranged in parallel rows and at approximate right angles to one another. Likewise they may extend in lines normal to the edges of the glass sheets or diagonally thereof. Although exaggerated in size for the sake of clarity, these wires are actually very small and dependence is placed upon their combined tensile strength. Being formed by wires of relatively small diameter, the vein-like appearance of the network or grid does not disturb the field of vision of the pilot or interfere materially therewith.

So that the grid 21 will adequately perform its supporting function, the wires 22 are arranged in overlaid or interwoven relation and secured together in each area of their contact as by pressure welding or in some other manner. The joints thus effected, as illustrated at 23, reduce the tendency of any wire to operate as an independent support and thereby localize the strains of resisting pressure in any one area. Rather, the entire network operates bodily and in a unitary sense so that pressures, directed either inwardly or outwardly, are sustained by the summation of the wires thereby materially diminishing any opportunity for individual breakage.

The network 21 is connected to the metal reenforcement or band 20 that is embedded in the extended plastic flange 19. More particularly, the wires 22 of the network or grid 21 are each anchored at their ends 24 to the metal band 20 as by soldering, welding or like methods, as indicated at 25 in Fig. 4. In addition, as shown in Fig. 2, the ends 24 of the wires 22 are preferably secured to that surface of the metal band 20 which faces outwardly of the plane, that is, to the outboard surface of said band. It is believed that such an arrangement will have the important advantage of providing greater stability to the grid and will assist in permitting the network to operate in a unitary sense whereby the entire unit will be rendered capable of resisting the excessive exterior pressures commonly encountered in supersonic aircraft. When such pressures are directed at the unit, the grid will be flexed inwardly, and resistance to continued thrust and consequent breakage of the unit will be provided by the contact between the grid and band. Thus, limited movement will be permitted by the grid, but by virtue of its location outwardly of the band, further movement will be effectively blocked.

In mounting the laminated glass unit, the glass sheet 16 is considered the outboard surface and is arranged flush with the outer surface of the skin or covering 26 of the plane. Located between the plastic attaching flange 19 and the covering 26, is a gasket 27, preferably of rubber or like composition. The gasket 27 may be formed in one piece, or a plurality of strips, and is provided with an outwardly directed shoulder 28 disposed opposite the peripheral edges of the outer glass sheet 16. A similar gasket 29 is arranged on the opposite side of the flange 19 and likewise has a shoulder 30 similar to the shoulder 28 of the gasket 27.

The plastic attaching flange 19 is securely clamped against the covering 26 of the plane and between the gaskets 27 and 29, by a frame member 31 through which clamping bolts or the like 32 are inserted, said bolts also passing through openings 33 in the flange 19 and metal band 20 encased therein. Preferably the heads of the bolts 32 are seated in conforming countersunk openings in the covering 26 while threaded upon the inner ends of said bolts and drawn up tightly against the frame 31 are nuts 34.

With such an arrangement, excessive air pressures exerted upon the laminated unit from either within or outside the plane, or the shock of accidental collision with flying birds or other objects, will be carried or absorbed by the wire grid or network 21 and not imposed entirely upon the extended attaching flange 19 of the plastic interlayer 18. As a result, accidental or forcible displacement of the laminated glass unit 15, from its installed position, will be effectively prevented.

The integral relationship between the wire network 21 and metal band 20 increases the stability of the unit and the mounting thereof in the airplane will minimize edge deflection of the extended plastic flange and the liability of tearing or shearing thereof. These advantages are obtained, while at the same time, permitting a certain amount of floating movement of the laminated glass due to the flexibility of the extended plastic attaching flange 19.

It is to be understood that the form of the invention herewith shown and described is to be taken as a preferred embodiment of the same, but that various changes in the shape, size and arrangement of parts may be resorted to without departing from the spirit of the invention or the scope of the subjoined claims.

I claim:

1. A laminated glass unit, comprising two sheets of glass and an interposed layer of plastic material bonded thereto to provide a composite structure, the plastic interlayer extending beyond the edges of the glass sheets to provide a flexible attaching flange, a metal reenforcing band embedded in the extended plastic flange, and a metal reenforcing grid secured to the outboard surface of said metal reenforcing band and arranged between the glass sheets.

2. A laminated glass unit, comprising two sheets of glass and an interposed layer of plastic material bonded thereto to provide a composite structure, the plastic interlayer extending beyond the edges of the glass sheets to provide a flexible attaching flange, a metal reenforcing band embedded in the extended plastic flange, a metal reenforcing grid embedded in the plastic interlayer between the glass sheets and comprising a plurality of spaced wires, and metallic means securing the ends of the wires to the outboard surface of the metal reenforcing band in the attaching flange.

3. A laminated glass unit, comprising two sheets of glass and an interposed layer of plastic material bonded thereto to provide a composite structure, the plastic interlayer extended beyond the edges of the glass sheets to provide a flexible attaching flange, a metal reenforcing band embedded in the extended plastic flange, a metal reenforcing grid embedded in the plastic interlayer between the glass sheets and comprising a plurality of spaced wires extending at right angles to one another in overlapping relation, metallic means securing the ends of the wires to the outboard surface of the metal reenforcing band in the plastic attaching flange, and metallic means securing the wires together where they overlap one another.

4. A laminated glass unit, comprising two sheets of glass and an interposed layer of plastic material bonded thereto to provide a composite structure, the plastic interlayer extending beyond the edges of the glass sheets to provide a flexible attaching flange, a metal reenforcing band embedded in the extended plastic flange and projecting inwardly of the edges of the glass sheets, a metal reenforcing grid embedded in the plastic interlayer between the glass sheets and including a plurality of spaced wires extending at right angles to one another in overlapping and interwoven relationship, metallic means securing the ends of the wires to the outboard surface of the metal reenforcing band and to that portion of the band projecting inwardly of the edges of the glass sheets, and metallic means securing the wires together in their overlapping and interwoven areas.

GEORGE B. WATKINS.

References Cited in the file of this patent

UNITED STATES PATENTS

| Number | Name | Date |
| --- | --- | --- |
| 1,327,281 | Jenkins | Jan. 6, 1920 |
| 1,632,323 | Bull | June 14, 1927 |
| 2,028,670 | Hosking | Jan. 21, 1936 |
| 2,121,777 | Bailey | June 28, 1938 |
| 2,222,742 | Ducret | Nov. 26, 1940 |
| 2,322,582 | Marini | June 22, 1943 |
| 2,382,956 | Boicey | Aug. 21, 1945 |
| 2,490,433 | Gunning | Dec. 6, 1949 |